US011948268B2

(12) United States Patent
Wu et al.

(10) Patent No.: US 11,948,268 B2
(45) Date of Patent: Apr. 2, 2024

(54) IMMERSIVE VIDEO BITSTREAM PROCESSING

(71) Applicant: ZTE Corporation, Guangdong (CN)

(72) Inventors: Zhao Wu, Guangdong (CN); Ming Li, Guangdong (CN); Ping Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 338 days.

(21) Appl. No.: 17/346,668

(22) Filed: Jun. 14, 2021

(65) Prior Publication Data

US 2021/0312588 A1  Oct. 7, 2021

Related U.S. Application Data

(63) Continuation of application No. PCT/CN2018/121093, filed on Dec. 14, 2018.

(51) Int. Cl.
| | |
|---|---|
| *G06T 3/06* | (2024.01) |
| *G06T 3/60* | (2006.01) |
| *G06T 9/00* | (2006.01) |
| *H04N 19/105* | (2014.01) |
| *H04N 19/17* | (2014.01) |
| *H04N 19/597* | (2014.01) |
| *H04N 19/85* | (2014.01) |

(52) U.S. Cl.
CPC .................. *G06T 3/06* (2024.01); *G06T 3/60* (2013.01); *G06T 9/00* (2013.01); *H04N 19/105* (2014.11); *H04N 19/17* (2014.11); *H04N 19/597* (2014.11); *H04N 19/85* (2014.11)

(58) Field of Classification Search
CPC ........... G06T 3/0031; G06T 3/60; G06T 9/00; H04N 19/105; H04N 19/17; H04N 19/597; H04N 19/85; H04N 19/70; H04N 19/184

See application file for complete search history.

(56) References Cited

U.S. PATENT DOCUMENTS

| | | | |
|---|---|---|---|
| 2017/0118475 A1* | 4/2017 | Chang | .................... H04N 19/56 |
| 2017/0336705 A1* | 11/2017 | Zhou | ......................... G06T 9/00 |
| 2018/0020238 A1 | 1/2018 | Liu et al. | |

(Continued)

FOREIGN PATENT DOCUMENTS

| | | |
|---|---|---|
| CN | 107040783 | 8/2017 |
| CN | 107871304 A | 4/2018 |

(Continued)

OTHER PUBLICATIONS

Office Action for co-pending Japanese Patent Application No. 2021-533828, dated Sep. 27, 2022, 6 pages with unofficial summary of office action.

(Continued)

*Primary Examiner* — Xuemei G Chen

(74) *Attorney, Agent, or Firm* — Perkins Coie LLP

(57) ABSTRACT

Techniques for encoding or decoding digital video or pictures include acquiring a video bitstream that includes an encoded video image that is a two-dimensional image comprising multiple regions of a panoramic image in three-dimensional coordinates, extracting neighboring information for the multiple regions, performing, using the neighboring information, post-processing of a video image decoded from the video bitstream, and generating a display image from the video image after the post-processing.

20 Claims, 11 Drawing Sheets

(56) References Cited

U.S. PATENT DOCUMENTS

| | | | |
|---|---|---|---|
| 2018/0035172 A1 | 2/2018 | Lai et al. | |
| 2018/0054613 A1* | 2/2018 | Lin | H04N 19/117 |
| 2018/0109810 A1* | 4/2018 | Xu | H04N 19/176 |
| 2018/0165886 A1* | 6/2018 | Lin | G06T 15/205 |
| 2018/0192074 A1* | 7/2018 | Shih | H04N 19/105 |
| 2018/0262775 A1* | 9/2018 | Lee | H04N 19/563 |
| 2018/0268517 A1* | 9/2018 | Coban | H04N 19/597 |
| 2018/0359459 A1* | 12/2018 | Lee | H04N 13/111 |
| 2019/0007679 A1* | 1/2019 | Coban | H04N 19/115 |
| 2019/0014347 A1* | 1/2019 | Hendry | H04N 19/86 |
| 2019/0026858 A1* | 1/2019 | Lin | H04N 19/182 |
| 2019/0158815 A1* | 5/2019 | He | H04N 21/234327 |
| 2019/0199995 A1 | 6/2019 | Yip et al. | |
| 2019/0238811 A1* | 8/2019 | Xiu | H04N 9/78 |
| 2019/0253622 A1* | 8/2019 | Van der Auwera | H04N 19/86 |
| 2019/0253703 A1* | 8/2019 | Coban | H04N 19/159 |
| 2019/0253732 A1* | 8/2019 | Hendry | H04N 19/597 |
| 2019/0260990 A1 | 8/2019 | Lim et al. | |
| 2019/0268584 A1* | 8/2019 | Leleannec | G06T 3/0062 |
| 2019/0272616 A1* | 9/2019 | Lee | G06T 7/13 |
| 2019/0272617 A1* | 9/2019 | Lee | G06T 3/0087 |
| 2019/0281273 A1* | 9/2019 | Lin | H04N 19/82 |
| 2019/0281293 A1* | 9/2019 | Lin | H04N 19/86 |
| 2019/0297350 A1* | 9/2019 | Lin | H04N 19/176 |
| 2019/0335203 A1* | 10/2019 | Li | H04N 19/593 |
| 2019/0387212 A1* | 12/2019 | Oh | G06T 3/0031 |
| 2019/0387250 A1* | 12/2019 | Boyce | H04N 19/52 |
| 2020/0045342 A1* | 2/2020 | Bordes | H04N 19/61 |
| 2020/0053393 A1* | 2/2020 | Niamut | G06T 3/0062 |
| 2020/0077070 A1* | 3/2020 | Takahashi | H04N 13/122 |
| 2020/0084428 A1* | 3/2020 | Oh | H04N 13/194 |
| 2020/0105063 A1* | 4/2020 | Wang | H04N 21/4728 |
| 2020/0112710 A1* | 4/2020 | Oh | H04N 19/174 |
| 2020/0120325 A1 | 4/2020 | Yip et al. | |
| 2020/0120359 A1* | 4/2020 | Hanhart | H04N 19/117 |
| 2020/0169754 A1* | 5/2020 | Wang | H04N 13/122 |
| 2020/0177916 A1* | 6/2020 | Niamut | H04N 19/154 |
| 2020/0260062 A1* | 8/2020 | Sharma | H04N 23/683 |
| 2020/0260063 A1* | 8/2020 | Hannuksela | H04N 21/8456 |
| 2020/0260082 A1* | 8/2020 | Lim | H04N 19/176 |
| 2020/0260120 A1* | 8/2020 | Hanhart | H04N 19/597 |
| 2020/0374505 A1* | 11/2020 | Kammachi Sreedhar | H04N 21/854 |
| 2020/0396461 A1* | 12/2020 | Zhao | H04N 19/176 |
| 2021/0051331 A1* | 2/2021 | Konda | H04N 19/14 |
| 2021/0073938 A1* | 3/2021 | Yu | H04N 19/597 |
| 2021/0092367 A1* | 3/2021 | Lim | H04N 19/176 |
| 2022/0030264 A1* | 1/2022 | Niamut | H04N 19/52 |
| 2022/0038709 A1* | 2/2022 | Da Silva Pratas Gabriel | H04N 19/91 |
| 2022/0201327 A1* | 6/2022 | Xiu | H04N 19/105 |
| 2023/0132473 A1* | 5/2023 | Lee | H04N 13/366 382/154 |

FOREIGN PATENT DOCUMENTS

| | | |
|---|---|---|
| CN | 108012155 | 5/2018 |
| KR | 20180042098 A | 4/2018 |
| WO | 2018/045108 | 3/2018 |
| WO | 2018/048223 A1 | 3/2018 |
| WO | 2018045108 A1 | 3/2018 |
| WO | 2018/074813 | 4/2018 |
| WO | 2018/093851 | 5/2018 |
| WO | 2018093851 A1 | 5/2018 |
| WO | 2018/110839 A1 | 6/2018 |
| WO | 2018/154130 | 8/2018 |
| WO | 2018/154130 A1 | 8/2018 |
| WO | 2018/191224 | 10/2018 |

OTHER PUBLICATIONS

Extended European Search Report for EP Patent Application No. 18930270.6, dated Nov. 11, 2021 (10 pages).

Hanhart, P. et al., "High level syntax extensions for signaling of 360-degree video information," JVET-D JVET-D0093, pp. 1-6.

Hanhart, P. et al., "InterDigital's Response to the 3600 Video Category in Joint Call for Evidence on Video Compression with Capability beyond HEVC," JVET-G JVET-G0024, pp. 1-16.

He, Y. et al., "Content-Adaptive 360-Degree Video Coding Using Hybrid Cubemap Projection," 2018 Picture Coding Symposium, pp. 313-317.

Office Action for co-pending Chinese Patent Application No. 2018801002335, dated Mar. 4, 2023, 6 pages with unofficial summary of office action.

International Search Report and Written Opinion dated Apr. 28, 2019 for International Application No. PCT/CN2018/121093, filed on Dec. 14, 2018 (6 pages).

Article 94 Communication for Co-pending European Patent Application No. 18930270.6, dated Oct. 6, 2023, 7 pages.

Notification to Complete Formailities of Registration for co-pending Chinese Patent Application No. 2018801002335, dated Sep. 3, 2023, 4 pages with unofficial summary of office action.

* cited by examiner

IMMERSIVE VIDEO BITSTREAM PROCESSING

CROSS-REFERENCE TO RELATED APPLICATIONS

This application is a continuation of International Patent Application No. PCT/CN2018/121093, filed on Dec. 14, 2018, the contents of which are incorporated herein by reference in their entirety.

TECHNICAL FIELD

This patent document is directed generally to video and image encoding and decoding.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding and decoding digital video that carries visual information related to multi-dimensional images.

In one example aspect, a method for video or picture processing is disclosed. The method includes acquiring a video bitstream that includes an encoded video image that is a two-dimensional image comprising multiple regions of a panoramic image in three-dimensional coordinates, extracting neighboring information for the multiple regions, performing, using the neighboring information, post-processing of a video image decoded from the video bitstream, and generating a display image from the video image after the post-processing.

In another example aspect, another method of video or picture processing is disclosed. The method includes acquiring a panoramic image in three-dimensional coordinates, mapping the panoramic image to a two-dimensional image comprising multiple regions, determining a neighboring information of the multiple regions, and transmitting or storing the video bitstream.

In another example aspect, an apparatus for processing one or more bitstreams of a video or picture is disclosed.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 3 shows an example of a video frame that includes mapped regions.

FIG. 4 shows an example of a video frame that includes mapped and rotated regions.

DETAILED DESCRIPTION

Section headings are used in the present document only to improve readability and do not limit scope of the disclosed embodiments and techniques in each section to only that section. Certain features are described using the example of the H.264/AVC (advanced video coding) and H.265/HEVC (high efficiency video coding) standards. However, applicability of the disclosed techniques is not limited to only H.264/AVC or H.265/HEVC systems.

Brief Discussion

Mobile communication has profoundly changed people's lives. With the development of mobile communication, from SD to Ultra HD, from flat to panoramic stereo, from standard dynamic range (SDR) to high dynamic range (HDR), from pseudo-color to true color, from interlaced to progressive. Scanning, from 30 frames per second to 120 frames per second, from TV to mobile phones, people are increasingly demanding to view media content, and viewing forms are diverse. Immersive media brings different experiences to users in entertainment and games, such as somatosensory games and immersive movies.

Unlike the previous video, the immersive video uses multiple cameras to capture the original video data. In order to use existing video coding standards, such as H.265/HEVC, the original data acquired by the acquisition needs to be mapped and rearranged, and finally generated rectangular coding area.

In some embodiments disclosed herein, immersive media data is mapped from spherical to two-dimensional planes, and then rearranged. The adjacent mapping areas after rearrangement are not necessarily adjacent to the original spherical surface. In areas that are not adjacent to the spherical surface, there is no spatial continuity characteristic, and if encoded together, the optimal compression rate cannot be obtained.

Brief Overview

Some embodiments described herein may benefit from advantageous techniques to mark whether adjacent areas of the mapped or rearrange data region are adjacent to each other on the spherical surface, to control the range of encoding by using adjacent information, to avoid the encoding of non-adjacent areas together, and to improve the coding efficiency. When decoding, the use of adjacent information can be more targeted for error recovery or post-processing.

Embodiment Example I

According to the embodiment of the present invention, the panoramic image data under spherical coordinates are collected, the panoramic image data is mapped from spherical coordinates to rectangular two-dimensional coordinates, then the mapped images are rearranged to determine the adjacent relations of the adjacent regions in each region of the rearranged four weeks under the original spherical coordinates, and the adjacent relational information is written to the code stream. Send or store the stream of code.

Figure 1:
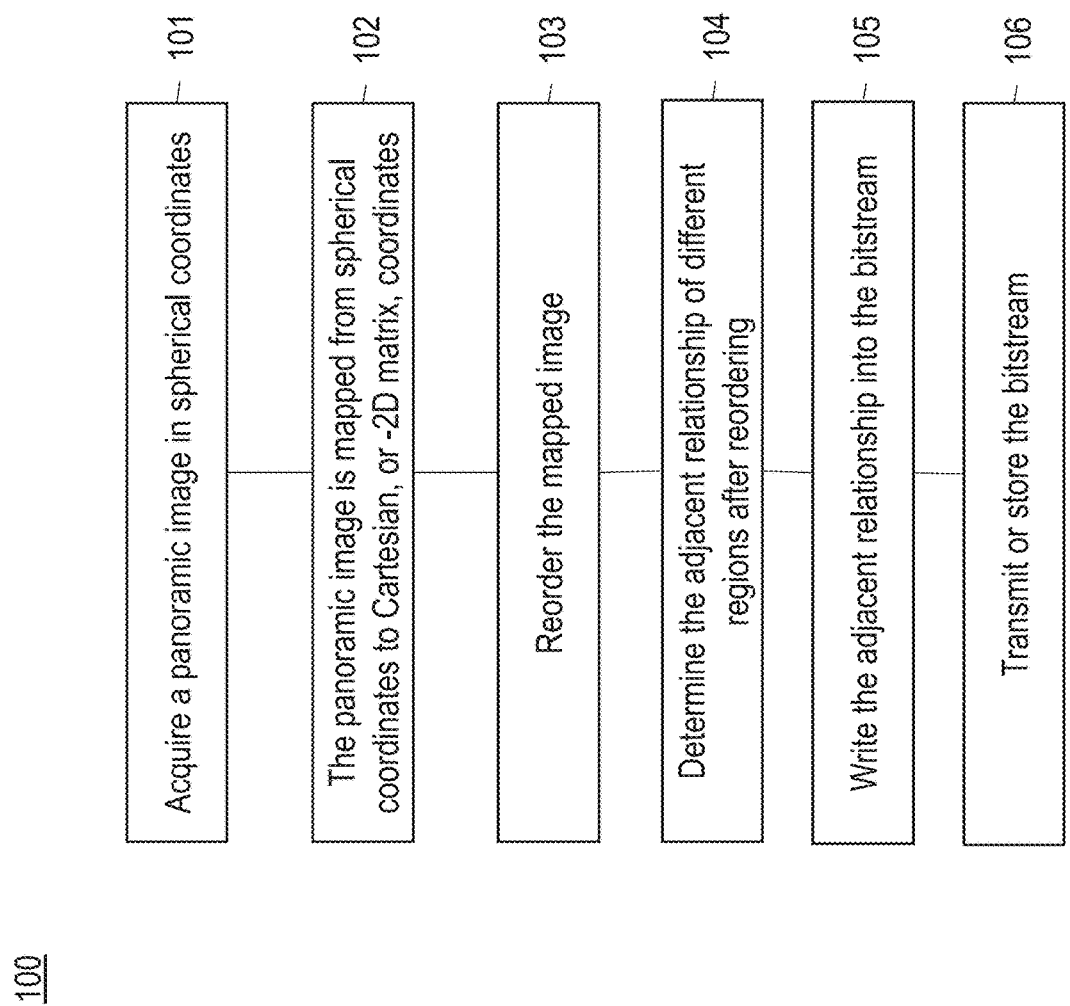
FIG. 1 is a flowchart of an example process of video encoding.

FIG. 1 is a flowchart of the code flow processing method 100 according to the embodiment of the present invention.

The steps are as follows:

Step 101: collecting and acquiring a panoramic image under spherical coordinates. The image may be received from a camera source or from a storage unit where the image is stored.

For example, the panoramic image data in spherical coordinates is generated by the camera acquisition. It can be that multiple cameras are spliced at the same time after acquisition, or a single camera can capture multiple images and then splicing through translation and rotation operations.

Step 102: mapping the panoramic image from spherical coordinates to two-dimensional rectangular coordinates (Cartesian).

The panoramic image data is mapped and converted according to the set mapping rules to generate two-dimensional rectangular image data.

The mapping rules may be, but are not limited to, cylinder mapping Equirectangular (ERP), cube mapping Cubemap (CMP), octahedron mapping Octahedron (OHP), icosahedral mapping Icosahedron (ISP), truncated pyramid mapping Truncated Square Pyramid (TSP), Segmented Sphere Projection (SSP), Adjusted Cubemap Projection (ACP), Rotated Sphere Projection (RSP), Equi-angular Cubemap Projection (EAC), Equatorial Cylindrical Projection (ECP), Hybrid Equi-angular Cubemap Projection (HEC), Viewport generation using rectilinear projection, Crasters Parabolic Projection (CCP), etc.

Figure 2A:
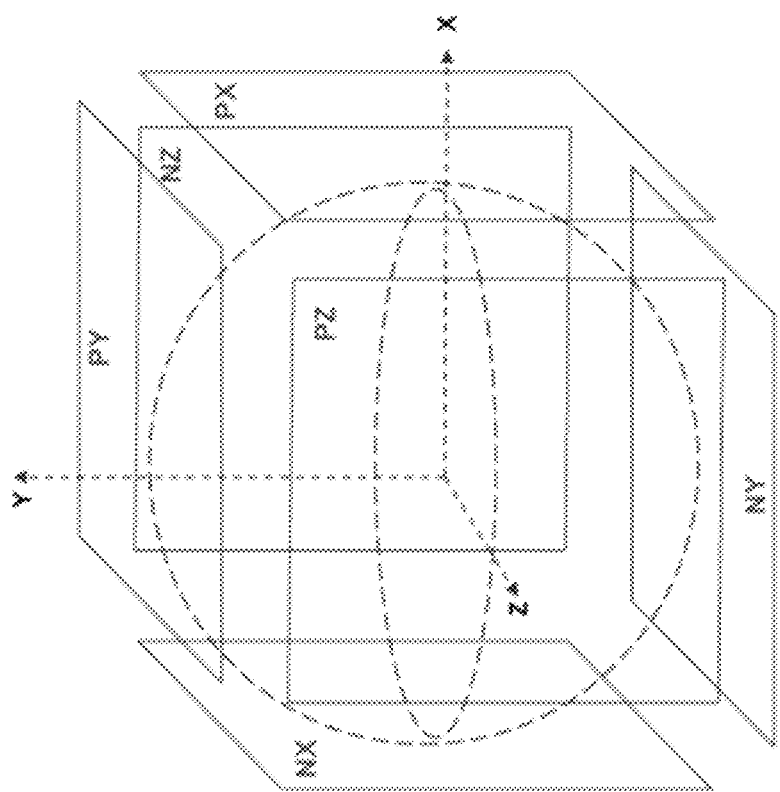
FIG. 2A-2B show an example of mapping from spherical to 2-dimensional coordinate system.

FIG. 2A shows an example of an image that is taken in a spherical coordinate system and then mapped to multiple planes (e.g., 6 2-D surfaces). In FIG. 2A, each planar view may have equal dimensions (e.g., W×W×W, where W represents width, height and depth. Alternatively, some of the 2-D surfaces may be rectangular. For example, the dimensions of the box may be W×D×H, where W is the width, D is the depth and H is the height, and at least some of W, D and H may be different from each other.

Figure 2B:
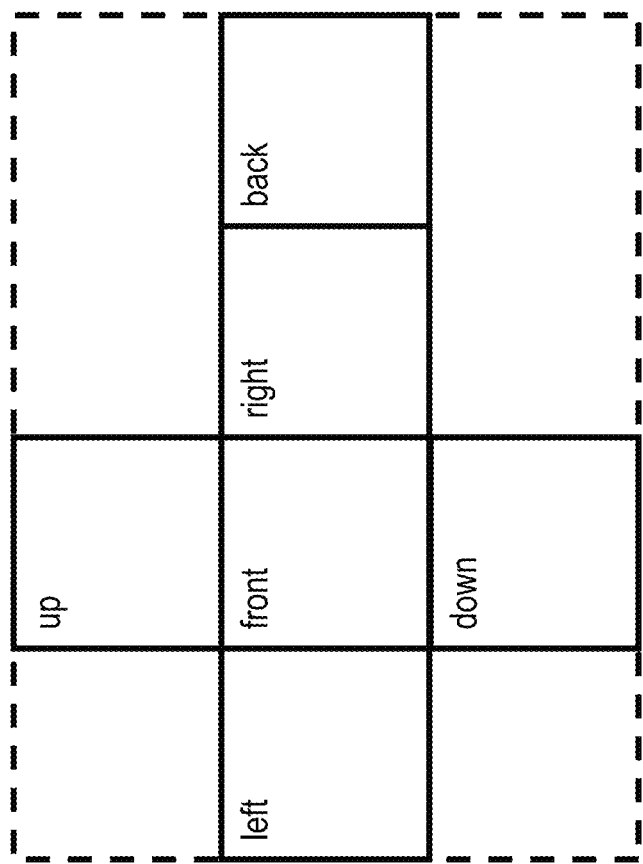

FIG. 2B shows the corresponding resulting six regions in a two-dimensional plane. The regions represent up, left, front, right, back and down viewing planes. This particular mapping is sometimes called cube mapping.

Step 103: In this step, a rearrangement or re-positioning of the mapped two-dimensional rectangular images is performed. It can be seen in FIG. 2B that some image data is occupied by the image regions, while the four remaining corners of the dashed rectangle to not have a corresponding image data.

Figures 3, 4:
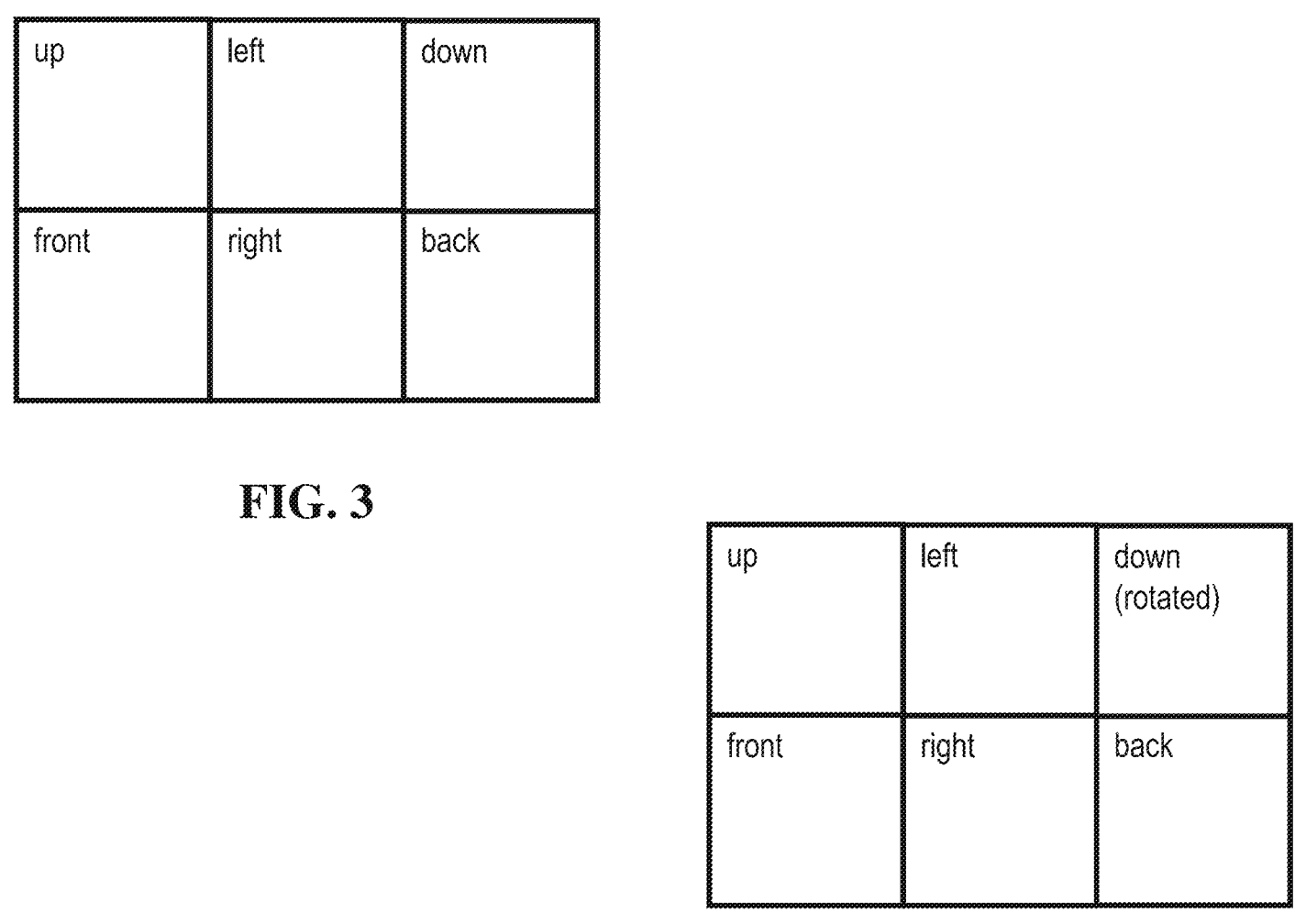

After the rearrangement is performed, it may be possible to eliminate the non-image data area from the complete image rectangular data area, as shown in FIG. 3 is the stereo mapping after the rearrangement image is generated.

The rearrangement image depicted in FIG. 3, may still have visual discontinuities among some of the regions. The visual continuity may be established by rotating one of the regions or tiles of the image, as shown in FIG. 4. This rotation and rearrangement image of the sub-region after the stereo mapping thus provides a 2-D image that captures all the information from the original 3D image and presents it on a 2-D rectangular region in a compact and visually correlated manner. For example, in the rectangular video picture shown in FIG. 4, none of the pixel are "dummy" pixels that do not represent any image information.

Step 104: At this step, the neighbor relationship between different regions after reordering may be determined and stored. This step may be implemented concurrently with other steps during the re-ordering process.

The adjacent relationship includes whether the different regions and the surrounding regions are adjacent in spherical coordinates, and Table 1 shows an organizational relationship of the contents of the adjacent relationship between the regions and the surrounding regions. In the tables, the term uimsbf stands for "unsigned integer most significant bit first," the term "double" refers to double precision format, e.g., 64 bits.

TABLE 1

| Syntax element | Value | Number of bits | type |
| --- | --- | --- | --- |
| adjacent_info_table( ) { | | | |
|   table_id | | 8 | uimsbf |
|   version | | 8 | uimsbf |
|   length | | 32 | uimsbf |
|   table_payload { | | | |
|     adjacent_num | N | 8 | uimsbf |
|     i = 0 | | | |
|     while( i < N ) { | | | |
|       sphere_adjacent_flag | | 8 | uimsbf |
|       sphere_position_x | | | |
|       sphere_position_y | | | |
|       sphere_position_z | | 32 | double |
|       rect_position_x | | 32 | double |
|       rect_position_y | | 32 | double |
|       rotate_flag | | 32 | double |
|       if(rotate_flag == 1) | | | |
|         rotate_degree | | 32 | double |
|       user_data( ) | | | |
|       ...... | | | |
|     } | | | |

In some example embodiments, the following use for the above-listed syntax element may be used.

table_id: identifier of the table;
  version: version information;
  length: length information (in number of bits or bytes);
  adjacent_num: the number of adjacent areas;
  sphere_adjacent_flag: Whether this neighborhood is adjacent to the current area on the spherical surface, 1: adjacent, 0: not adjacent
  (sphere_position_x, sphere_position_y, sphere_position_z): three-dimensional coordinate information on the spherical surface of the upper left corner of this neighborhood;
  (rect_position_x, rect_position_y): two-dimensional coordinate information of the upper left corner of the neighborhood on a rectangular plane;
  rotate_flag: Whether this neighborhood is rotated, 1: rotated, 0: not rotated.
  rotate_degree: the rotation angle of this neighborhood;
  user_data( ): user information.

Step 105: At this step, the adjacent relationship information may be written to a field in the bitstream representation of the 3-D video.

For example, the syntax shown in Table 1 may be used to represent the above adjacent relationship information is written into the code stream.

Step 106: Upon generation of the compressed representation of the 3-D video, this step may include transmitting or storing the bitstream for later use or transmission.

The field may be included in the bitstream using one of the techniques described in the present document.

Embodiment Example II

In step 104 of the first embodiment, the adjacent_info_table can be written into the RectRegionPacking structure in the video stream OMAF, and the specific example is as shown in Table 2. In various embodiments, the adjacent_info_table may be inserted into the video bitstream at a sequence level, or a picture level, or a tile level or NAL level.

TABLE 2

```
aligned(8) class RectRegionPacking(i) {
    unsigned int(32) proj_reg_width[i];
    unsigned int(32) proj_reg_height[i];
    unsigned int(32) proj_reg_top[i];
    unsigned int(32) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
    adjacent_info_table(i);
}
```

An instance of adjacent_info_table, as shown in Table 3. In this example, the adjacent info table includes a number of information elements that are present in the table (adjacent_num). The table may then list the spherical and rectangular positions of the regions respectively. In case that a particular region was rotated, the table includes a field that indicates the rotation and an amount of rotation.

While Table 3 shows an example of conversion between spherical and rectangular coordinate systems, similar tables representing the mapping (and rotation, if any) between other coordinate systems described in the present document and their corresponding two-dimensional coordinate system representations may be included. In some cases, the encoder's choice of coordinate system may be signaled in the video bitstream at the sequence or picture level.

TABLE 3

```
aligned(8) class adjacent_info_table(i) {
    unsigned int(8) adjacent_num;
    for (j = 0; j < adjacent_num; j++) {
        unsigned int(8) sphere_adjacent_flag;
        double(32) sphere_position_x;
        double(32) sphere_position_y;
        double(32) sphere_position_z;
        unsigned int(32) rect_position_x;
        unsigned int(32) rect_position_y;
        unsigned int(8) rotate_flag;
        if(rotate_flag == 1)
            double(32) rotate_degree;
    }
}
```

Embodiment Example III

In step 104 of embodiment one, the bits corresponding to the adjacent_info_table may be stored into the supplementary Enhancement information (supplemental enhancement Information, SEI) field in the video bitstream, as shown in the structure shown in Table 4.

TABLE 4

| | Descriptor |
|---|---|
| sei_payload( payloadType, payloadSize ) {<br>......<br>  if( payloadType == ADJACENT_INFO) {<br>......<br>    adjacent_info_table( payloadSize );<br>......<br>  }<br>} | |

In Table 2, adjacent_info_table ( ) is an adjacent_info_table data structure with the embodiment one, which contains the adjacent information of the region.

Information that identifies information as ADJACENT_INFO can be obtained from the SEI information.

Embodiment Example IV

In this embodiment, referring to step 104 of Embodiment I, a video encoder may write adjacent_info_table to the video app information field (video usability information, VUI), as shown in the structure shown in Table 5. In the tables in this document, the following terms are used:

u(n): unsigned integer using n bits. When n is "v" in the syntax table, the number of bits varies in a manner dependent on the value of other syntax elements.

ue(v): unsigned integer 0-th order Exp-Golomb-coded syntax element with the left bit first.

TABLE 5

| | Descriptor |
|---|---|
| vui_parameters( ) {<br>......<br>  adjacent_info_flag<br>  if(adjacent_info_flag) {<br>......<br>    adjacent_info_table( );<br>......<br>  }<br>} | u(1) |

The adjacent_info_flag value in Table 5 is equal to "1," indicating that there is subsequent area adjacent information.

adjacent_info_table ( ) is an adjacent_info_table data structure with the embodiment one, which contains the adjacent information of the region.

Embodiment Example V

In step 104 of embodiment I, adjacent_info_table can be written to the system Layer Media Property Description unit, such as the description of the transport stream, the data unit in the file format (such as box), the media description information of the transport stream, such as the media rendering description information units in a media presentation description or MPD file.

Embodiment Example VI

In the 104 of embodiment one, the adjacent information of the region is combined with the limited tile set (temporal motion-constrained Tile sets, or MCTS) of the time domain motion using the H.265/HEVC standard. An example syntax is as shown in Table 6.

In the syntax below, adjacent_info_flag:0 indicates that there is no area adjacent information, and 1 indicates that there is regional adjacent information.

TABLE 6

| | Descriptor |
|---|---|
| temporal_motion_constrained_tile_sets( payloadSize ) { | |
|   mc_all_tiles_exact_sample_value_match_flag | u(1) |
|   each_tile_one_tile_set_flag | u(1) |
|   if( !each_tile_one_tile_set_flag ) { | |
|     limited_tile_set_display_flag | u(1) |
|     num_sets_in_message_minus1 | u(1) |
|     for( i = 0; i <= num_sets_in_message_minus1; i++ ) { | |
|       mcts_id[ i ] | ue(v) |
|       ...... | |
|       num_tile_rects_in_set_minus1[ i ] | ue(v) |
|       for( j = 0; j <= num_tile_rects_in_set_minus1[ i ]; j++ ) { | |
|         top_left_tile_index[ i ][ j ] | ue(v) |
|         bottom_right_tile_index[ i ][ j ] | ue(v) |
|         adjacent_info_flag | u(1) |
|         if(adjacent_info_flag == 1) | |
|           adjacent_info( ) | |
|       } | |
|     ...... | |
|     } | |
|   }else { | |
|     max_mcs_tier_level_idc_present_flag | u(1) |
|     if( mcts_max_tier_level_idc_present_flag ) { | |
|       mcts_max_tier_flag | u(1) |
|       mcts_max_level_idc | u(8) |
|     } | |
|     adjacent_info_flag | u(1) |
|     if(adjacent_info_flag == 1) | |
|       adjacent_info( ) | |
|   } | |
| } | |

An example of the adjacent_info field is shown in Table 7.

TABLE 7

| | Descriptor |
|---|---|
| adjacent_info( ) { | |
|   length | ue(v) |
|   adjacent_num | ue(v) |
|   i = 0 | |
|   while( i < N ) { | |
|     sphere_adjacent_flag | u(8) |
|     sphere_position_x | ue(v) |
|     sphere_position_y | ue(v) |
|     sphere_position_z | ue(v) |
|     rect_position_x | ue(v) |
|     rect_position_y | ue(v) |
|     rotate_flag | u(8) |
|     if(rotate_flag == 1) | |
|       rotate_degree | ue(v) |
|     } | |
|   } | |

In this table, the various entries may have values representing information as below.

length: length information (length of the table in bits or bytes);
adjacent_num: number of adjacent areas;
sphere-adjacent-flag: Whether this neighborhood is adjacent to the current area on the spherical surface, 1: adjacent, 0: not adjacent
(sphere_position_x, sphere_position_y, sphere_position_z): three-dimensional coordinate information of the upper left corner of this neighborhood on the spherical surface;
(rect_position_x, rect_position_y): two-dimensional coordinate information on the rectangular plane in the upper-left corner of this neighborhood;
rotate_flag: Whether this neighborhood rotates, 1: After rotation, 0: without rotation.
rotate_degree: The rotation angle of this neighborhood.

Embodiment Example VII

Figure 5:
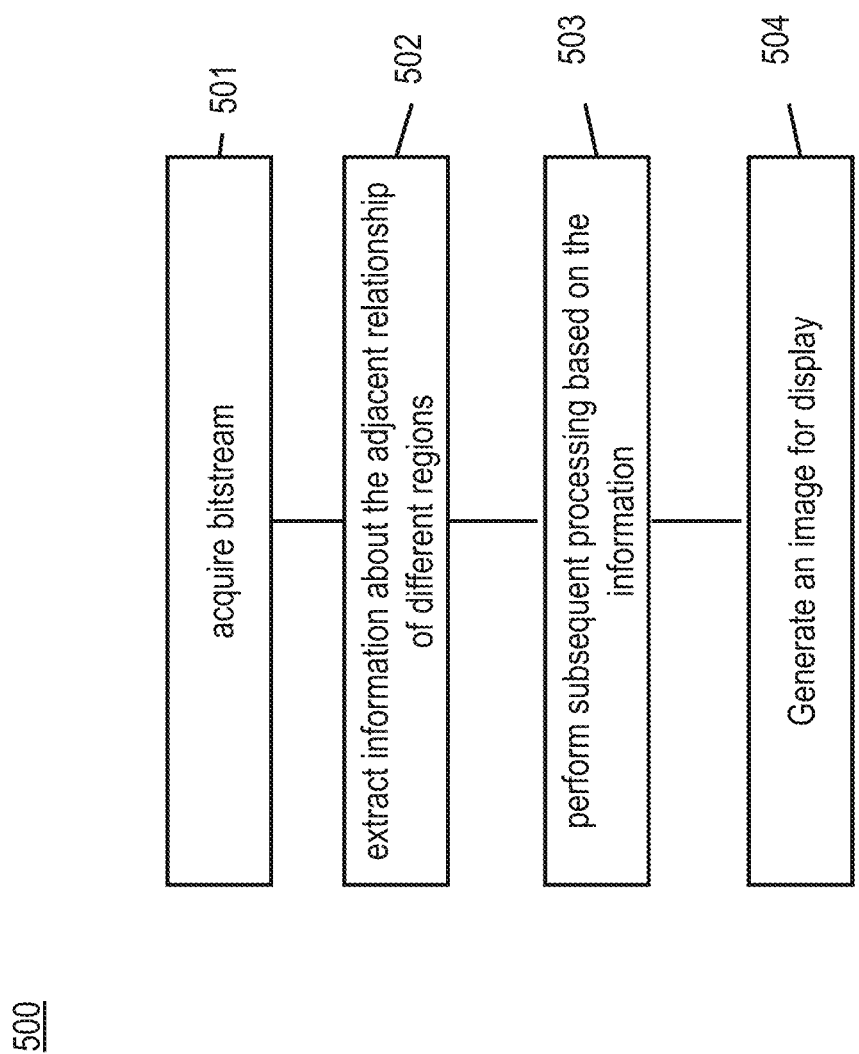
FIG. 5 shows an example flowchart of a video decoding process.

This embodiment may be implemented at a video decoder. According to this embodiment, a process flow 500 of which is shown in FIG. 5, the video decoder may acquire the bitstream (501), extract the adjacent information of the region from the bitstream (502), process the regional data obtained in bitstream (503) according to the above information. The bitstream and the adjacent relationship information may be used to generate a decoded or decompressed image (504) for displaying to a user interface.

In various embodiments, each of the above steps may further be implemented as follows.

Step 501: Acquire a bitstream

The bitstream may be a video stream or a streaming media stream that includes system layer information. The bitstream may be acquired over a network connection or from a data storage device such as a hard drive, an optical disk or a solid state memory.

Step 502: Extracting area neighbor information from the bitstream.

The neighboring information of the area is extracted according to different locations placed by the region of interest information, such as SEI, VUI, MPD, and the like.

Step 503: Perform post-processing on the area data according to the above information.

According to the area neighbor information, combined with the video codec unit, such as the codec unit using the H.264/AVC standard slice group (Slice Group), or using the H.265/HEVC standard tile (Tile), the image data is post-processed. One example post-processing application may include border filtering on adjacent areas. Such an operation may be performed to enhance the viewing quality of the image. Another example post-processing operation includes processing non-adjacent areas without boundary filtering. For example, using the information about neighboring regions, filtering may be suppressed of disabled across a border of visual discontinuity. Another example of post-processing may be error compensation or recovery. In such an operation, error compensation for missed visual information at a certain location may be generated only using data of adjacent areas for compensation, without using non-adjacent area information make up. Such a strategy at the video decoder, for example, advantageously masks visual obviousness of errors from missed bits in a bitstream by providing an image that looks visual continuous to the user.

Step 504: Generate an image for display.

After video decoding (decompression) and the additional post-processing, an image may be generated and may be stored in a data memory and/or displayed on a display device.

Embodiment Example VIII

In this embodiment, the video area belongs to the stereoscopic video, and the adjacent information of the area is simultaneously used in the left and right fields of view.

Embodiment Example IX

In some embodiments, the regions of video data may be encoded without being rearranged, and at the same time, region neighbor information is generated. If the adjacent region is a padding region, the region neighboring information sphere_adjacent_flag is set to 2, indicating that the neighborhood does not exist on the spherical surface.

TABLE 8

| Syntax element | Value | Number of bits | type |
|---|---|---|---|
| adjacent_info_table( ) { | | | |
| ...... | | | |
|   table_payload { | | | |
|     adjacent_num | N | 8 | uimsbf |
|     i = 0 | | | |
|     while( i < N ) { | | | |
|       sphere_adjacent_flag | | 8 | uimsbf |
|       if(sphere_adjacent_flag != 2) | | | |
|       { | | | |
|         sphere_position_x | | 32 | double |
|         sphere_position_y | | 32 | double |
|         sphere_position_z | | 32 | double |
|         rect_position_x | | 32 | double |
|         rect_position_y | | 32 | double |
|         rotate_flag | | 8 | uimsbf |
|         if(rotate_flag == 1) | | | |
|         rotate_degree | | 32 | double |
|       ...... | | | |
|     } | | | |
|     ...... | | | |
|   } | | | |
| } | | | |

Embodiment Example X

Figure 6:
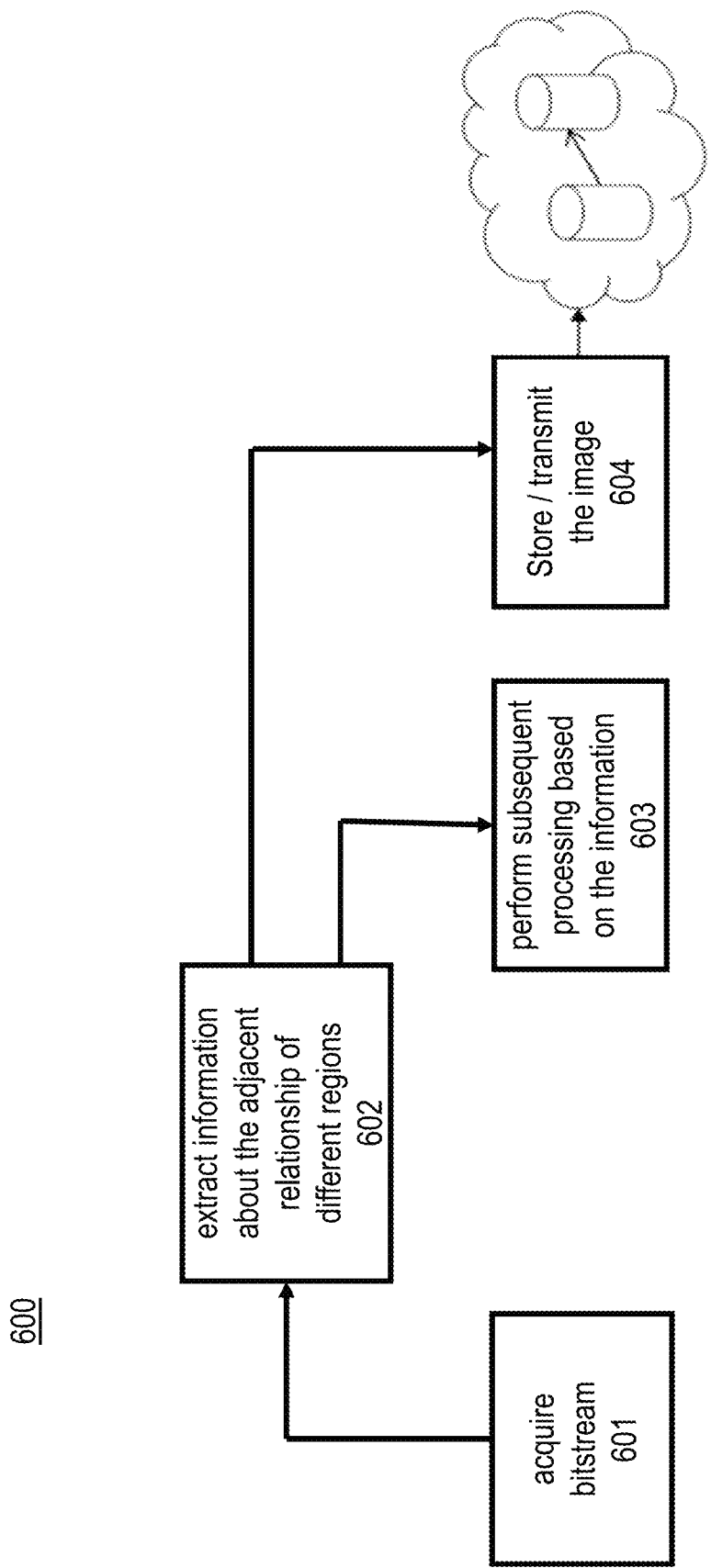
FIG. 6 is a block diagram of an example of a video encoding apparatus.

This embodiment corresponds to the bitstream processing method 100 described in Embodiment 1. Embodiment 10 may correspond to a device 600, as shown in FIG. 6. The device 600 includes:

An acquiring module 601 that is configured to collect spherical panoramic video image information. This module may include input-output controller circuitry for reading video data from memory or from a camera frame buffer. This module may include processor executable instructions for reading video data.

A mapping rearrangement module 602 that is configured to map and rearrange spherical panoramic video image data and generate regional neighbor information. This module may be implemented as processor executable software code.

A video encoder module 603 configured to encode the rearranged video image data according to the area neighbor information. The video encoder module 603 may for example be a conventional H.264/H.265 or another codec that is suitable for encoding of video and images that are rectangular in shape. The video encoder module 603 may use techniques that use motion estimation/compensation or intra-image coding techniques.

The display/transmission module 604 is configured to perform either storage or network transmission layer coding on the video encoded data or the media data, and may encode the video data that includes the neighbor information of the area, or separately encode the video data and the adjacent data of the area.

The above-described acquisition device 601, mapping rearrangement module 602, video encoder 603, and transmission module 604 can be implemented by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The device 600 in this embodiment may be a device in a video application, such as a mobile phone, a computer, a server, a set top box, a portable mobile terminal, a digital video camera, a television broadcast system device, or the like.

Embodiment Example XI

Figure 7:
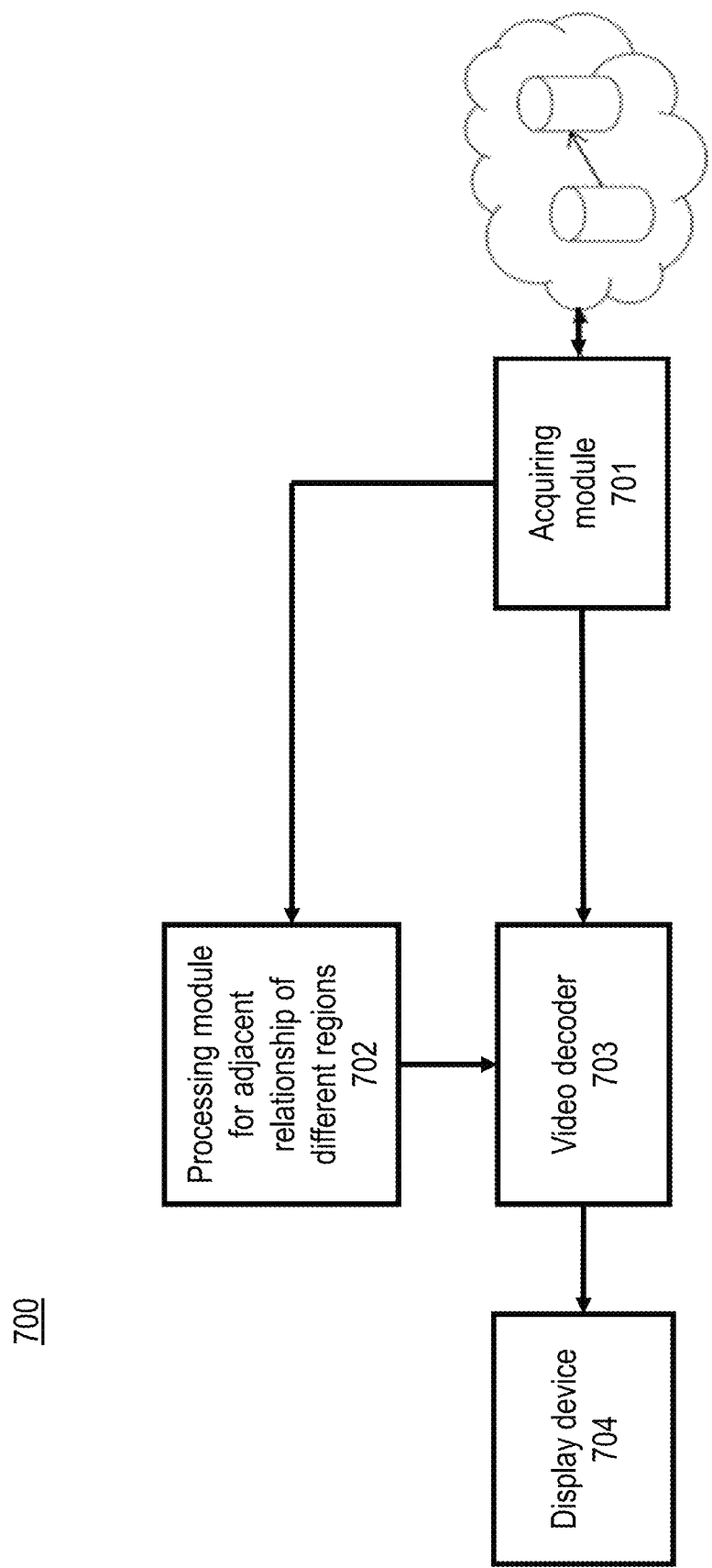
FIG. 7 is a block diagram of an example of a video decoding apparatus.

This embodiment corresponds to the bitstream processing method described in Embodiment VII, and Embodiment XI relates to a device 700 that implements the video decoding. As shown in FIG. 7, the device includes:

The acquiring module 701 is configured to acquire the bitstream from the network or a storage device and perform decoding from network transmission layer data including video encoded data or media data, and may only propose area neighbor information data, or extract video data including area neighbor information;

The adjacent area information processing module 702 is configured to parse the area neighbor information.

The video decoder 703 is configured to decode the video data information, decode the panoramic video, or extract the independent decoding unit where the region of interest is located for decoding.

The display device 704 is configured to generate or display a panoramic video image or select a partial adjacent area image display.

The above-described transmission module 701, the area adjacent information processing module 702, the video decoder 703, and the display device 704 can be realized by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The device of this embodiment may be a device in a video application, such as a mobile phone, a computer, a server, a set top box, a portable mobile terminal, a digital video camera, a television broadcast system device, or the like.

Embodiment Example XII

Figure 9:
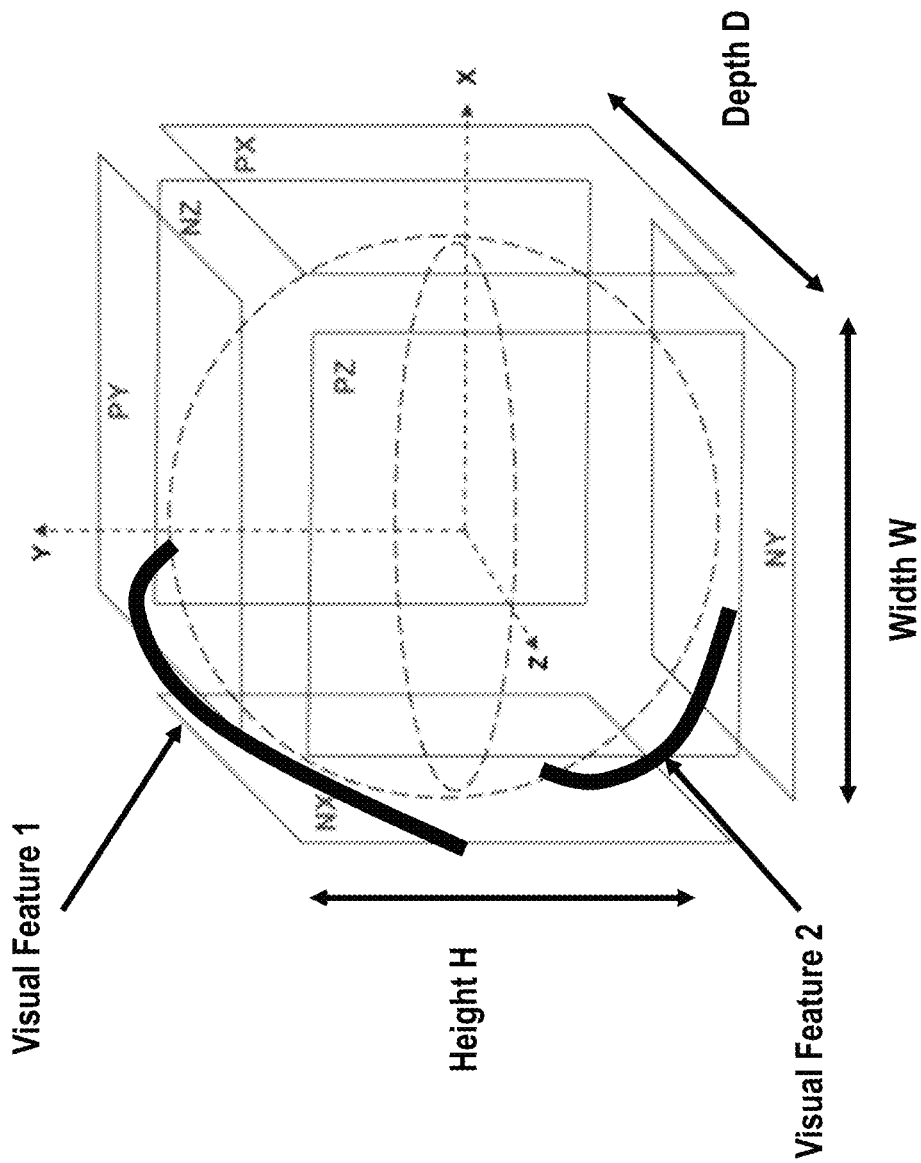
FIG. 9 shows another example of an immersive video image in spherical coordinates.

FIG. 9 shows an example of an immersive video picture in a spherical coordinate system. This coordinate system is similar to the coordinate system depicted in FIG. 2A. Two visual features, labeled Visual Feature 1 and Visual Feature 2, are shown in FIG. 9. These features may be visual representation of rigid objects in real world. Visual Feature one lies along the curved surface of the spherical coordinate system and may be visible both in the top view and the left view. Similarly, Visual Feature 2 may be visible in the left view and also continue to be visible in the bottom view. The dimensions of this spherical representation may be W×H×D, where W, H and D may in general be different quantities.

Figure 10:
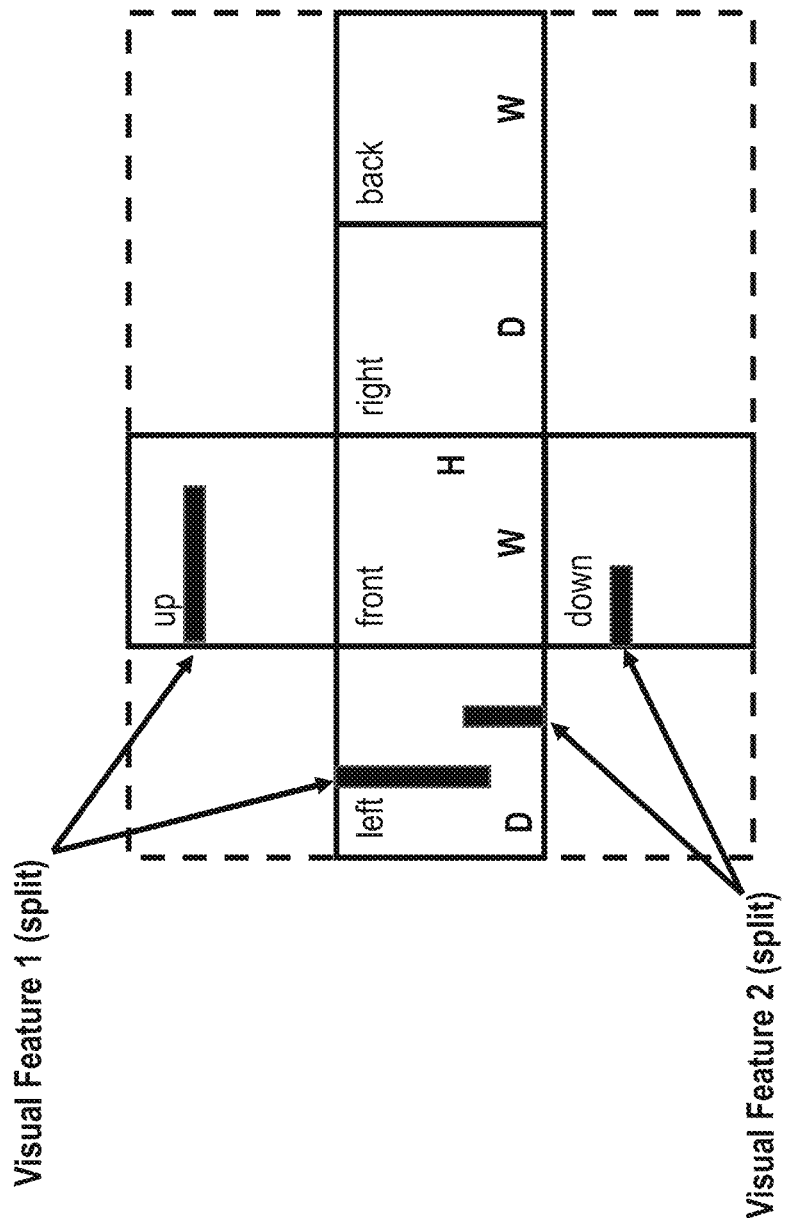
FIG. 10 shows a two-dimensional mapping of the spherical image in FIG. 9.

FIG. 10 shows a mapping of the spherical view in FIG. 9 into a two-dimensional rectangular coordinate system. As can be seen for the view, Visual Features 1 and 2 both are split across the edges of the up/left view and the left/down view respectively.

While this does not present any loss of information and a re-mapping at the decoder side can restore the visual continuity using the adjacent info tables described in the document, certain video processing such as motion prediction and post-motion compensation filtering may tend to create artifacts at boundaries. Such artifacts may be eliminated or suppressed using the present techniques.

Figure 11:
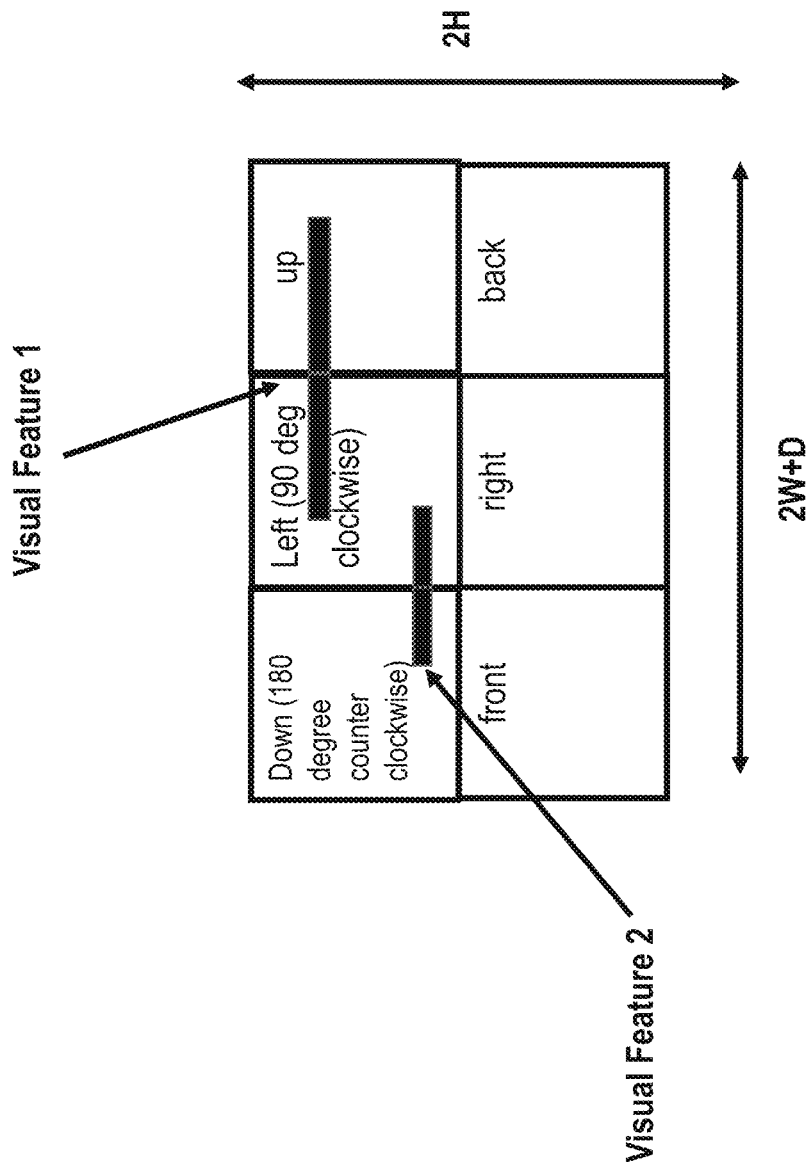
FIG. 11 shows an example of a video frame generated after mapping and rotating picture regions to maintain visual continuity between different views.

FIG. 11 shows a mapping and reordering of the regions in the two-dimensional coordinate systems in which some of the regions are rotated to re-establish visual continuity of visual features such as Visual Feature 1 and Visual Feature 2. After the mapping and rotation, the resulting video picture is of 2*W+D width and 2*H height. In this example, one of the regions is rotated by 180 degrees counter-clock wise and another region is rotated by 90 degrees clockwise (or 270 degrees counter-clock wise). One advantageous aspect of this embodiment is that due to the mapping and rotation, the resulting two-dimensional picture is a rectangular picture even when H, W and D may have different values. Therefore, this scheme works even when the three-dimensional immersive video is captured using different dimensions of bounding boxes during the mapping operation.

Figure 8:
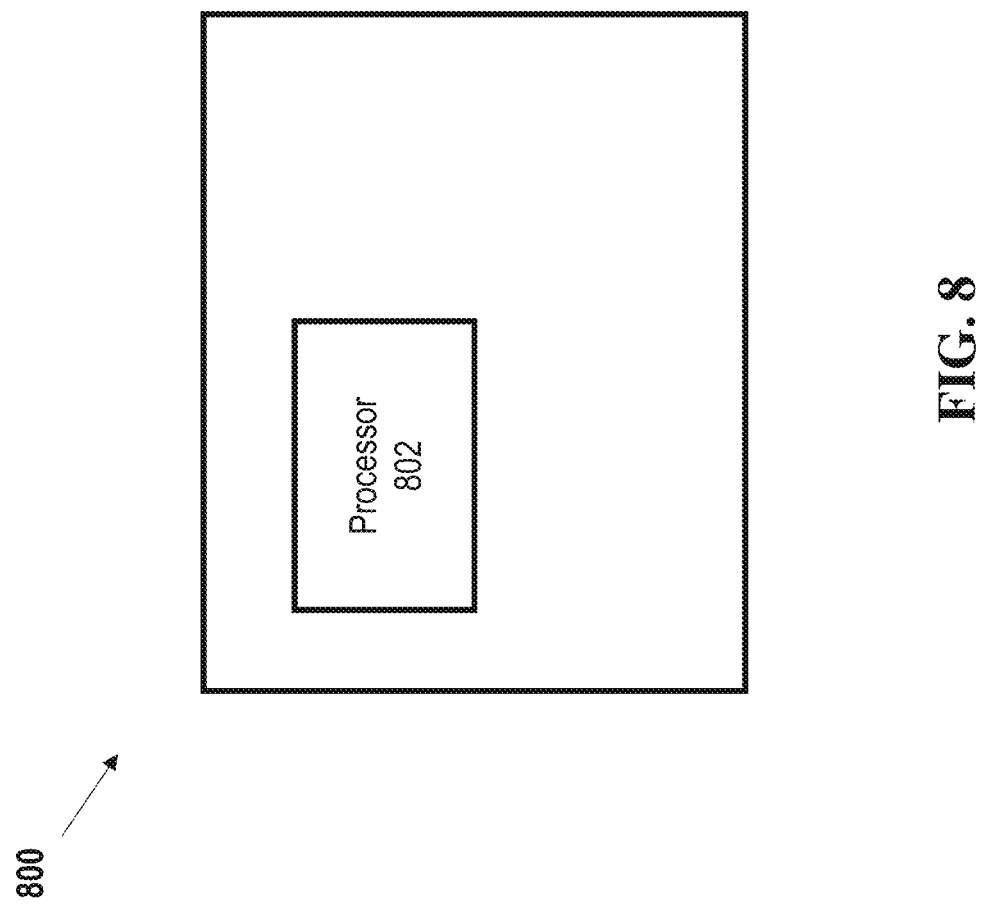
FIG. 8 is a block diagram of an embodiment of a hardware platform for implementing methods described herein.

FIG. 8 shows an example apparatus 800 that may be used to implement encoder-side or decoder-side techniques described in the present document. The apparatus 800 includes a processor 802 that may be configured to perform the encoder-side or decoder-side techniques or both. The apparatus 800 may also include a memory (not shown) for storing processor-executable instructions and for storing the video bitstream and/or display data. The apparatus 800 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

Some of the disclosed techniques can be described using the following clause-based description:

1. A method for video or picture processing, comprising: acquiring a video bitstream that includes an encoded video image that is a two-dimensional image comprising multiple regions of a panoramic image in three-dimensional coordinates; extracting neighboring information for the multiple regions; performing, using the neighboring information, post-processing of a video image decoded from the video bitstream; and generating a display image from the video image after the post-processing.

The method of clause 1 may be used for decoding a single picture or a sequence of pictures such as a video bitstream. FIG. 5 and related description describes additional embodiments and feature of method of clause 1.

2. A method of video or picture processing, comprising: acquiring a panoramic image represented in three-dimensional coordinates; mapping the panoramic image to a two-dimensional image comprising multiple regions; determining a neighboring information of the multiple regions; generating a video bitstream from of the panoramic image that includes the neighboring information; and transmitting or storing the video bitstream.

The method of clause 2 may be used for encoding a single picture or a sequence of pictures such as a video bitstream. FIG. 1 and related description describes additional embodiments and feature of method of clause 2.

3. The method of clauses 1-2, wherein the neighboring information is included in the video bitstream in a supplemental enhancement information (SEI) field.

4. The method of any of clauses 1-2, wherein the neighboring information is included in the bitstream in a video usability information (VUI) field.

5. The method of any of clauses 1-2, wherein the neighboring information is included in a media presentation description (MPD) format.

6. The method of any of clauses 1-5, wherein the neighboring information includes, for regions of the multiple regions, information including a number of one or more adjacent regions, three dimensional coordinates and rectangular coordinates for the one or more adjacent regions, or an indication of rotation of the one or more adjacent regions.

7. The method of clause 6, wherein the neighboring information further includes one or more angles of rotation for the one or more adjacent regions.

8. The method of any of clauses 4-5, wherein the neighboring information includes an adjacent information table.

9. The method of any of clauses 1-8, wherein the three dimensional coordinates include cylinder coordinates Equirectangular (ERP) mapping, cube mapping, octahedron mapping, icosahedral mapping Icosahedron, truncated pyramid mapping, segmented sphere projection or truncated Square Pyramid.

10. A video encoder apparatus comprising a processor configured to implement a method recited in any one or more of claims 2-9.

11. A video decoder apparatus comprising a processor configured to implement a method recited in any one or more of claims 1 or 3-9

12. A computer program product having code stored thereon, the code, when executed by a processor, causing the processor to implement a method recited in any one or more of claims 1 to 9.

Additional embodiments and features of techniques described in clauses are disclosed throughout the present document.

One of ordinary skill in the art will appreciate that all or a portion of the above steps may be accomplished by a program that instructs the associated hardware, such as a read-only memory, a magnetic disk, or an optical disk. Alternatively, all or part of the steps of the above embodiments may also be implemented using one or more integrated circuits. Correspondingly, each module/unit in the above embodiment may be implemented in the form of hardware or in the form of a software function module. The invention is not limited to any specific form of combination of hardware and software.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video or picture processing, comprising:
    acquiring a video bitstream that includes an encoded video image that is a rectangular two-dimensional image comprising multiple regions of a panoramic image corresponding to a width W, a height H and a depth D in three-dimensional coordinates,
        wherein the encoded video image has a width 2*W+D and a 2*H height and the multiple regions include a top left portion representing a down view rotated 180 degrees in a counter clockwise direction, a top middle portion representing a left view rotated 90 degrees clockwise, a top right portion representing an up view, a bottom left portion representing a front view, a bottom middle portion representing a right view and a bottom right portion representing a back view of the panoramic image,
        wherein the down view, the left view, the up view, the front view, the right view, and the back view are views according to a coordinate system defined by x, y, and z axes,
        wherein the down view and the up view represent views along the y axis where the down view has a lower y coordinate value than that of the up view,
        wherein the left view and the right view represent views along the x axis where the left view has a lower x coordinate value than that of the right view, and
        wherein the front view and the back view represent views along the z axis where the back view has a lower z coordinate value than that of the front view;
    extracting neighboring information for the multiple regions;
    performing, using the neighboring information, post-processing of a video image decoded from the video bitstream; and
    generating a display image from the video image after the post-processing.

2. The method of claim 1, wherein the neighboring information is included in the video bitstream in a supplemental enhancement information (SEI) field.

3. The method of claim 1, wherein the neighboring information is included in the bitstream in a video usability information (VUI) field.

4. The method of claim 1, wherein the neighboring information is included in a media presentation description (MPD) format.

5. The method of claim 1, wherein the neighboring information includes, for the multiple regions, information including a number of one or more adjacent regions, three dimensional coordinates and rectangular coordinates for the one or more adjacent regions, or an indication of rotation of the one or more adjacent regions.

6. The method of claim 5, wherein the neighboring information further includes one or more angles of rotation for the one or more adjacent regions.

7. The method of claim 5, wherein the neighboring information includes an adjacent information table.

8. The method of claim 1, wherein the three dimensional coordinates include cylinder coordinates Equirectangular (ERP) mapping, cube mapping, octahedron mapping, icosahedral mapping Icosahedron, truncated pyramid mapping, segmented sphere projection or truncated Square Pyramid.

9. A method of video or picture processing, comprising:
acquiring a panoramic image having a width W, a height H and a depth D represented in three-dimensional coordinates;
mapping the panoramic image to a rectangular two-dimensional image comprising multiple regions including a top left portion representing a down view rotated 180 degrees in a counter clockwise direction, a top middle portion representing a left view rotated 90 degrees clockwise, a top right portion representing an up view, a bottom left portion representing a front view, a bottom middle portion representing a right view and a bottom right portion representing a back view of the panoramic image,
wherein the down view, the left view, the up view, the front view, the right view, and the back view are views according to a coordinate system defined by x, y, and z axes,
wherein the down view and the up view represent views along the y axis where the down view has a lower y coordinate value than that of the up view,
wherein the left view and the right view represent views along the x axis where the left view has a lower x coordinate value than that of the right view, and
wherein the front view and the back view represent views along the z axis where the back view has a lower z coordinate value than that of the front view;
determining a neighboring information of the multiple regions;
generating a video bitstream from of the panoramic image that includes the neighboring information; and
transmitting or storing the video bitstream.

10. The method of claim 9, wherein the neighboring information is included in the video bitstream in a supplemental enhancement information (SEI) field.

11. The method of claim 9, wherein the neighboring information is included in the bitstream in a video usability information (VUIJ) field.

12. The method of claim 9, wherein the neighboring information is included in a media presentation description (MPD) format.

13. The method of claim 9, wherein the neighboring information includes, for the multiple regions, information including a number of one or more adjacent regions, three dimensional coordinates and rectangular coordinates for the one or more adjacent regions, or an indication of rotation of the one or more adjacent regions.

14. The method of claim 13, wherein the neighboring information further includes one or more angles of rotation for the one or more adjacent regions.

15. The method of claim 9, wherein the neighboring information includes an adjacent information table.

16. The method of claim 9, wherein the three dimensional coordinates include cylinder coordinates Equirectangular (ERP) mapping, cube mapping, octahedron mapping, icosahedral mapping Icosahedron, truncated pyramid mapping, segmented sphere projection or truncated Square Pyramid.

17. A video decoder apparatus comprising a processor configured to implement a method, comprising:
acquiring a video bitstream that includes an encoded video image that is a rectangular two-dimensional image comprising multiple regions of a panoramic image corresponding to a width W, a height H and a depth D in three-dimensional coordinates,
wherein the encoded video image has a width 2*W+D and a 2*H height and the multiple regions include a top left portion representing a down view rotated 180 degrees in a counter clockwise direction, a top middle portion representing a left view rotated 90 degrees clockwise, a top right portion representing an up view, a bottom left portion representing a front view, a bottom middle portion representing a right view and a bottom right portion representing a back view of the panoramic image,
wherein the down view, the left view, the up view, the front view, the right view, and the back view are views according to a coordinate system defined by x, y, and z axes,
wherein the down view and the up view represent views along the y axis where the down view has a lower y coordinate value than that of the up view,
wherein the left view and the right view represent views along the x axis where the left view has a lower x coordinate value than that of the right view, and
wherein the front view and the back view represent views along the z axis where the back view has a lower z coordinate value than that of the front view;
extracting neighboring information for the multiple regions;
performing, using the neighboring information, post-processing of a video image decoded from the video bitstream; and
generating a display image from the video image after the post-processing.

18. The video decoder apparatus of claim 17, wherein the neighboring information is included in the video bitstream in a supplemental enhancement information (SEI) field, or a video usability information (VUIJ) field, or a media presentation description (MPD) format.

19. The video decoder apparatus of claim 17, wherein the neighboring information a further includes one or more angles of rotation for one or more adjacent regions.

20. The video decoder apparatus of claim 17, wherein the neighboring information includes an adjacent information table.

* * * * *

UNITED STATES PATENT AND TRADEMARK OFFICE
CERTIFICATE OF CORRECTION

PATENT NO. : 11,948,268 B2  
APPLICATION NO. : 17/346668  
DATED : April 2, 2024  
INVENTOR(S) : Zhao Wu et al.

Page 1 of 1

It is certified that error appears in the above-identified patent and that said Letters Patent is hereby corrected as shown below:

In the Claims

In Column 15, Line 50, in Claim 9, delete "from of" and insert --from--, therefor.
In Column 15, Line 58, in Claim 11, delete "(VUIJ)" and insert --(VUI)--, therefor.
In Column 16, Line 56, in Claim 18, delete "(VUIJ)" and insert --(VUI)--, therefor.
In Column 16, Line 59, in Claim 19, delete "a further" and insert --further--, therefor.

Signed and Sealed this
Twenty-first Day of May, 2024

Katherine Kelly Vidal
*Director of the United States Patent and Trademark Office*